United States Patent
Hu et al.

(10) Patent No.: US 12,468,966 B2
(45) Date of Patent: Nov. 11, 2025

(54) APPARATUSES AND METHODS FOR COLOR MATCHING AND RECOMMENDATIONS

(71) Applicant: MICRON TECHNOLOGY, INC., Boise, ID (US)

(72) Inventors: Yi Hu, Boise, ID (US); Dmitry Vengertsev, Boise, ID (US); Zahra Hosseinimakarem, Boise, ID (US); Jonathan D. Harms, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/642,101

(22) Filed: Apr. 22, 2024

(65) Prior Publication Data

US 2024/0273388 A1    Aug. 15, 2024

Related U.S. Application Data (63) Continuation of application No. 17/005,036, filed on Aug. 27, 2020, now Pat. No. 11,995,567.

(51) Int. Cl.
| | |
|---|---|
| *G06N 5/04* | (2023.01) |
| *G06N 20/00* | (2019.01) |
| *G06T 7/00* | (2017.01) |
| *G06T 7/521* | (2017.01) |

(Continued)

(52) U.S. Cl.
CPC ............ *G06N 5/04* (2013.01); *G06N 20/00* (2019.01); *G06T 7/521* (2017.01); *G06T 7/90* (2017.01); *G06T 7/97* (2017.01); *G06T 11/001* (2013.01)

(58) Field of Classification Search
CPC .......... G06N 5/04; G06N 20/00; G06N 3/045; G06N 3/08; G06T 7/521; G06T 7/90; G06T 7/97; G06T 11/001; G06T 2207/10024; G06T 2207/20084; G06T 2207/30088; G06T 7/0012; G06F 16/9535;

(Continued)

(56) References Cited

U.S. PATENT DOCUMENTS

| | | | |
|---|---|---|---|
| 11,995,567 B2 | 5/2024 | Hu et al. | |
| 2001/0030748 A1* | 10/2001 | Jung | .................... G01J 3/0216 356/73 |

(Continued)

FOREIGN PATENT DOCUMENTS

| | | |
|---|---|---|
| CN | 103686144 A | 3/2014 |
| CN | 104995908 A | 10/2015 |

(Continued)

*Primary Examiner* — Pei Yong Weng
(74) *Attorney, Agent, or Firm* — Dorsey & Whitney LLP

(57) ABSTRACT

An image or a spectrum of a surface may be acquired by a computing device, which may be included in a mobile device in some examples. The computing device may extract a measured spectrum from the image and generate a corrected spectrum of the surface. In some examples, the corrected spectrum may be generated to compensate for ambient light influence. The corrected spectrum may be analyzed to provide a result, such as a diagnosis or a product recommendation. In some examples, the result is based, at least in part, on a comparison of the corrected spectrum to reference spectra. In some examples, the result is based, at least in part, on an inference of a machine learning model.

20 Claims, 7 Drawing Sheets

(51) Int. Cl.
*G06T 7/90* (2017.01)
*G06T 11/00* (2006.01)

(58) Field of Classification Search
CPC . G06F 16/5838; G01J 3/463; G01J 2003/467; G06Q 30/0631
See application file for complete search history.

(56) References Cited

U.S. PATENT DOCUMENTS

| | | | |
|---|---|---|---|
| 2003/0234930 A1* | 12/2003 | Pallingen | G01N 21/21 356/369 |
| 2009/0210373 A1 | 8/2009 | Yu et al. | |
| 2013/0300761 A1* | 11/2013 | Ahmed | G09G 5/02 345/595 |
| 2014/0180826 A1* | 6/2014 | Boal | G06Q 30/0269 705/14.66 |
| 2014/0289069 A1 | 9/2014 | Bhardwaj et al. | |
| 2016/0099270 A1 | 4/2016 | Hsu et al. | |
| 2017/0178220 A1* | 6/2017 | Chong | G06Q 50/01 |
| 2019/0373186 A1* | 12/2019 | Ortiz Egea | G06V 10/82 |
| 2021/0015240 A1* | 1/2021 | Elfakhri | G01J 3/46 |
| 2021/0326913 A1* | 10/2021 | Novak | G06Q 30/0631 |
| 2022/0067544 A1 | 3/2022 | Hu et al. | |

FOREIGN PATENT DOCUMENTS

| | | | |
|---|---|---|---|
| CN | 110570476 A | 12/2019 | |
| EP | 4000000 A1 | 5/2022 | |

* cited by examiner

APPARATUSES AND METHODS FOR COLOR MATCHING AND RECOMMENDATIONS

CROSS REFERENCE TO RELATED APPLICATION(S)

This application is a continuation of U.S. patent application Ser. No. 17/005,036, on Aug. 27, 2020. The aforementioned application is incorporated herein by reference, in its entirety, for any purpose.

BACKGROUND

Analysis of surface color is used in a variety of industries. For example, surface color may be analyzed for recommendations of cosmetic products or paint colors. For example, any consumers choose skin foundation based on a visual comparison. However, this requires the user to apply several different cosmetic products which may be messy and time consuming. In another example, to identify the correct paint to use for a wall a consumer may need to acquire paint swatches from a store, manually compare the swatches to the wall, then return to the store to purchase the proper paint or acquire additional swatches if none of the previous swatches provided an acceptable match. Acquiring data to quantitatively analyze a color of a surface and provide a product recommendation based on the analysis may require specialized equipment and a well-controlled environment to reduce lighting interference. This may reduce the availability and/or increase the cost of analyzing surface color. Accordingly, techniques for analyzing surface color with less expensive and/or more readily available equipment may be desired.

DETAILED DESCRIPTION

The following description of certain embodiments is merely exemplary in nature and is in no way intended to limit the scope of the disclosure or its applications or uses. In the following detailed description of embodiments of the present apparatuses, systems and methods, reference is made to the accompanying drawings which form a part hereof, and which are shown by way of illustration specific embodiments in which the described apparatuses, systems and methods may be practiced. These embodiments are described in sufficient detail to enable those skilled in the art to practice presently disclosed apparatus, systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

Surface color analysis is an emerging area of interest to provide improved color matching such as in cosmetics and painting. For example, in cosmetics, the lighting environment and/or the shininess of skin may lead to misjudgment of the skin color, resulting in a poor product selection. A store associate may recommend a foundation product based on the appearance of a customer's skin tone at the store. However, when the customer leaves the store, the skin tone may appear different because of the change in lighting. The associate may have recommended a different foundation product if the associate and customer had met outside the store under different lighting conditions. Existing techniques for analyzing surface color may require specialized equipment, which may limit the ability to acquire surface color data and/or provide recommendations based on analysis of the surface color. Therefore, techniques for a more affordable and/or reliable surface color analysis is desired.

According to examples of the present disclosure, a mobile device may be used to acquire surface color data and extract a measured spectrum from the data. In some examples, the mobile device may further analyze the measured spectrum to compensate for ambient light influence on the measured spectrum and generate a corrected spectrum. In some examples, the mobile device may provide a product recommendation and/or a diagnosis based at least in part on the corrected spectrum. In the case where the surface is a user's skin, a product recommendation may include a cosmetic product (e.g., base, foundation, setting powder, concealer) and a diagnosis may include a condition (e.g., redness, pores, pigmentation, oily or dry skin). In another example, the surface may be a wall and a product recommendation may include a paint color that matches the color or is complimentary to the tone of the surface color (e.g., warm, cool, neutral). In another example, the surface may be an item of apparel and a product recommendation may include matching clothing articles and/or accessories (e.g., shoes, sunglasses, necklaces, etc.). In some examples, the product recommendation and/or diagnosis may be generated by a machine learning model based, at least in part, on the measured spectrum and/or user's feedback on the product recommendation and diagnosis. As used herein, machine learning refers collectively to machine learning, deep learning, and/or other artificial intelligence techniques for making inferences from data.

Figure 1:
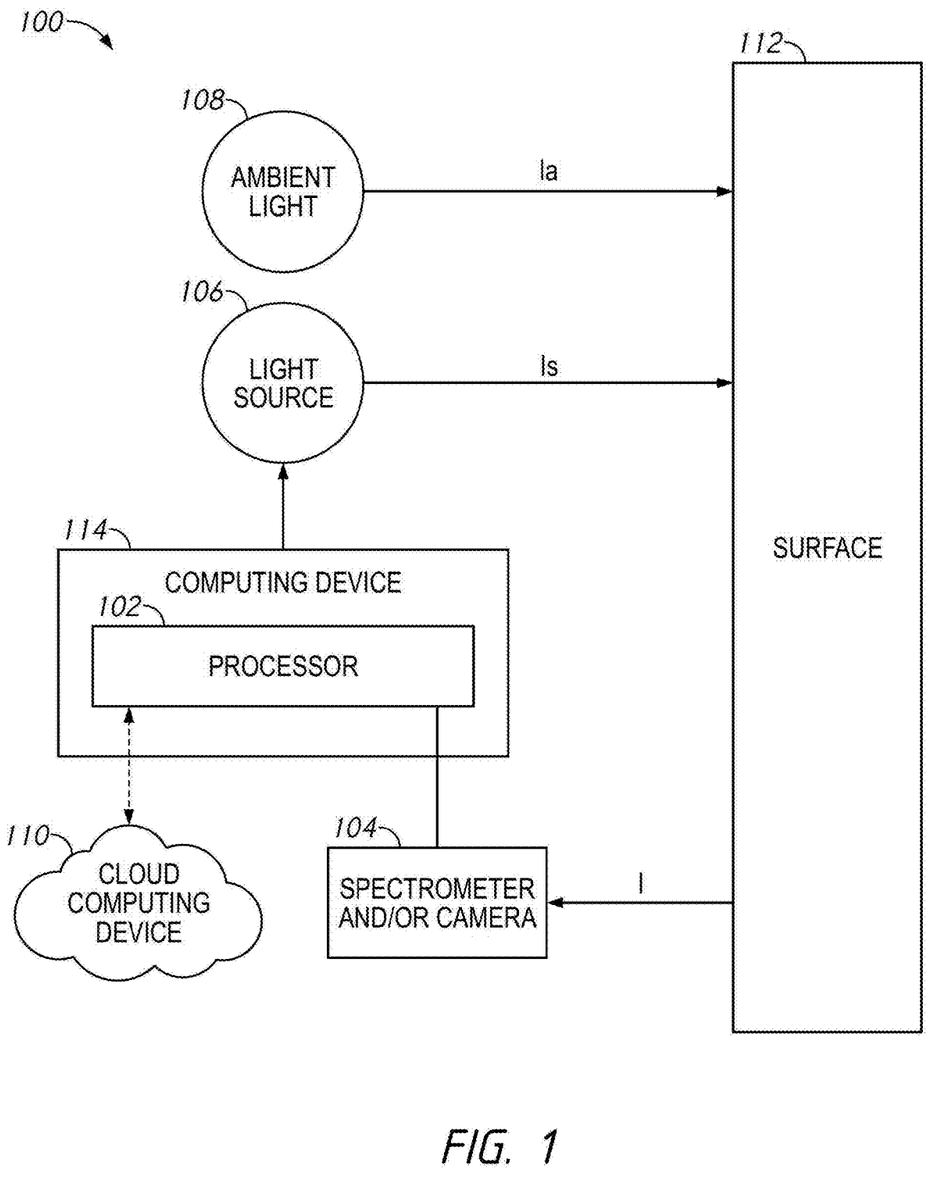
FIG. 1 is a schematic illustration of a system arranged in accordance examples of the present disclosure.

FIG. 1 is an illustration of a system 100 arranged in accordance examples of the present disclosure. The system 100 may include a processor 102, a computing device 114, a spectrometer and/or camera 104, and a light source 106. In some examples, the system 100 may also include a cloud computing device 110. The system 100 may acquire an image and/or a spectrum of a surface 112 using a camera and/or spectrometer 104. In some examples, the surface 112 may be illuminated by ambient light (Ia). In some examples, the surface 112 may be alternatively or additionally illuminated by light (Is) from the light source 106 and the spectrometer and/or camera 104 may acquire the data associated with the surface 112 (I). The data may include an image and/or a spectrum of the surface 112. The data may be processed by the processor 102 to extract a measured spectrum (I). For example, the processor 102 may extract a measured spectrum from an image acquired by the camera 104 or the measured spectrum may be acquired directly from the spectrometer 104. However, in some applications, the measured spectrum may not accurately reflect the color of the surface 112, for example, due to effects of ambient light 108. Ambient light 108 may have an uneven and/or unknown spectrum that may affect the apparent color of surface 112. Ambient light 108 may be reflected off the surface 112 and/or other surfaces and collected by the camera and/or spectrometer 104. Thus the measured spectrum (I) extracted by the processor 102 may be a mixture of the spectrum of the surface 112 and the ambient light 108. Therefore, the processor 102 may analyze the measured spectrum to remove ambient light influence (Ia) from the measured spectrum to generate a corrected spectrum of the surface 112 (I0). That is, in some examples, the corrected spectrum that includes the spectrum of the surface 112 may be expressed as I0=I−Ia. In examples where light source 106 is used to illuminate the surface 112, the corrected spectrum may be expressed as I0=I−Ia−Is.

The computing device 114 may compare the corrected spectrum (I0) with a database of reference spectra to generate a result. The result may be a spectrum from the data base of reference spectra that is the closest match to the corrected spectrum of the surface 112. The computing device 114 may provide a product recommendation and/or a diagnosis of the surface based, at least in part, on the result.

In some examples, the computing device 114 may be optionally communicatively coupled to the cloud computing device 110. For example, processor 102 may be communicatively coupled to the cloud computing device 110. In some examples, the cloud computing device 110 may store data including images and/or spectra received from computing device 114, a measured spectrum, a corrected spectrum generated by the processor 102, one or more databases of reference spectra, the result generated by the processor 102, and/or user feedback. In some examples, the cloud computing device 110 may implement one or more machine learning models to make inferences based on the data provided by the computing device 114. For example, the processor 102 may provide the corrected spectrum to the cloud computing device 110 and the cloud computing device 110 may return a product recommendation to the computing device 114 based on an inference of the one or more machine learning models.

Figure 2:
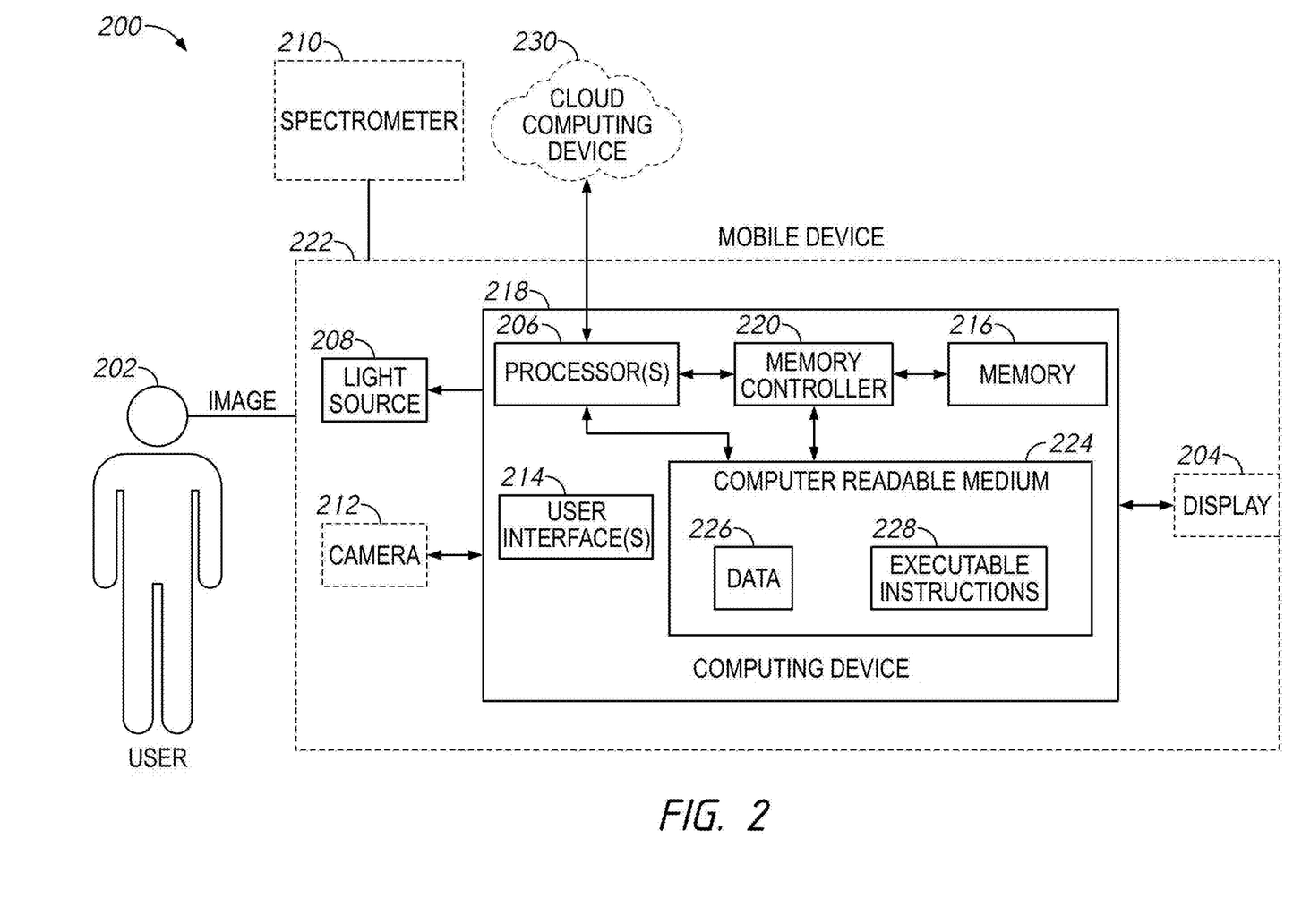
FIG. 2 is a schematic illustration of a computing system arranged in accordance with examples of the present disclosure.

FIG. 2 is a schematic illustration of a computing system 200 arranged in accordance with examples of the present disclosure. The computing system 200 may include a mobile device 222, a computing device 218, and/or a light source 208. Optionally, in some examples, the computing system 200 may include a display 204, camera 212, a spectrometer 210, and/or a cloud computing device 230. In some examples, the computing device 218 may include one or more processors 206, a computer readable medium (or media) 224, a memory controller 220, a memory 216, and/or user interface(s) 214. The computing system 200 may be used to implement the system 100 in some examples. The computing device 218 may be used to implement the computing device 114 in some examples. The processor(s) 206 may be used to implement the processor 102 in some examples. In some examples, the cloud computing device 230 may implement the cloud computing device 110. In some examples, light source 208 may implement light source 106 shown in FIG. 1.

In some examples, computing device 218 may be included in a mobile device 222, such as a smart phone, cell phone, gaming device, or tablet. In some examples, the computing device 218 may be implemented wholly or partially using a computer, a server, television, or a laptop. In some examples, the spectrometer 210 may be an accessory device that connects with the computing device 218 and/or mobile device 222. In other examples, the spectrometer 210 may be an integral element of the computing device 218 and/or mobile device 222, for example, a sensor on a smart phone. In some examples, such as the one shown in FIG. 2, the light source 208, camera 212, and/or display 204 may be integral elements of the mobile device 222 in communication with the computing device 218, for example, a camera, a flash, and a touch screen of a smart phone.

In some other examples, the processor 206 may be implemented using one or more central processing units (CPUs), graphical processing units (GPUs), application specific integrated circuits (ASICs), field programmable gate arrays (FPGAs), and/or other processor circuitry. In some examples, the processor(s) 206 may be in communication with a memory 216 via a memory controller 220. In some examples, the memory 216 may be volatile memory, such as dynamic random access memory (DRAM). The memory 216 may provide information to and/or receive information from the processor(s) 206 and/or computer readable medium 224 via the memory controller 220 in some examples. While a single memory 216 and a single memory controller 220 are shown, any number may be used. In some examples, the memory controller 220 may be integrated with the processor(s) 206.

The computing device 218 may include a computer readable medium 224. The computer readable medium 224 may be implemented using any suitable medium, including non-transitory computer readable media. Examples include memory, random access memory (RAM), read only memory (ROM), volatile or non-volatile memory, hard drive, solid state drives, or other storage. The computer readable medium 224 may be accessible to the processor(s) 206 and/or memory controller 220. The computer readable medium 224 may be encoded with executable instructions 228. The executable instructions 228 may be executed by the processor(s) 206. For example, the executable instructions 228 may cause the processor(s) 206 to analyze an acquired image to extract a measured spectrum from the image. In some examples, the executable instructions 228 may cause the processor(s) 206 to correct the measured spectrum extracted from an image or acquired from spectrometer 210, for example, to correct for effects of ambient light. In some examples, the executable instructions 228 may cause the processor(s) 206 to provide commands or other control signals to the light source 208, the camera 212, the display 204, spectrometer 210, and/or other components of the computing device 218, such as the memory controller 220.

The computer readable medium 224 may store data 226. In some examples, the data 226 may include an image received from camera 212 and/or a measured spectrum extracted from the image, a spectrum acquired by spectrometer 210, a corrected spectrum generated by the processor(s) 206, a database of reference spectra, a product recommendation, a diagnosis, and/or user feedback. While a single medium is shown in FIG. 2, multiple media may be used to implement computer readable medium 224.

The computing device 218 may be in communication with the display 204 that is a separate component (e.g., using a wired and/or wireless connection) or the display 204 may be integrated with the mobile device 222. In some examples, the display 204 may display data such as outputs (e.g., results) generated by the processor(s) 206, and/or images acquired by the camera 212. Any number or variety of displays may be present, including one or more LED, LCD, plasma, or other display devices.

In some examples, the user interface(s) 214 may receive inputs from a user 202. User inputs may include, but are not limited to, desired resolution, selection of one or more region of interests, tastes and preferences, and desired output (e.g., diagnosis, product recommendation). Examples of user interface components include a keyboard, a mouse, a touch pad, a touch screen, and a microphone. In some examples, the display 204 may be included in the user interface(s) 214. In some examples, the processor(s) 206 may implement a graphical user interface (GUI) via the user interface(s) 214, including the display 204. For example, the user 202 may review an image of a subject's face or other surface on the display 204, which may be a touch screen in some examples, and circle an area of interest on the image. In some examples, such as the one shown in FIG. 2, the subject may be the user 202. In some examples, the processor(s) 206 may communicate information, which may include user inputs, data, images, and/or commands, between one or more components of the computing device 218 and external apparatuses such as a spectrometer 210 that may generate a measured spectrum of the surface. In other examples, the user interface(s) 214 may be coupled with a recommendation engine according to a recommendation model to provide a recommendation of product. The product recommendation may be based on the user's tastes and preferences, and a determined match of the corrected spectrum generated by the processor(s) 206.

In some examples, the light source 208 may emit light for acquiring an image with the camera 212 and/or spectrometer 210. In some examples, the light source 208 may include a visible light source, an infrared light source, an infrared flood illuminator, an ultraviolet light source, and/or a broad spectrum light source (e.g., includes two or more of visible light, infrared light, and ultraviolet light). In some embodiments, the light source may be polarized. In some examples, the light source 208 may include an LED, a xenon flash tube, and/or other light source. In some examples, the light source 208 may be included with the camera 212. In some examples, the light source 208 may emit light responsive to a command provided by the camera 212 and/or one or more commands provided by the processor(s) 206.

In some examples, camera 212 may be used to acquire an image of a surface, such as surface 112 shown in FIG. 1. In some examples, camera 212 may include a charged-couple device (CCD), complementary metal oxide semiconductor (CMOS) sensor, and/or other light sensor. As described in more detail with reference to FIG. 6, the processor(s) 206 may extract a spectrum from the image acquired by the camera 212. In some examples, in addition or instead of acquiring an image with camera 212, spectrometer 210 may acquire a spectrum of the surface. In some examples, spectrometer 210 may include a CCD, a light dependent resistor, a photodiode, a phototransistor, and/or other light sensor.

In some examples, the user 202 may capture an image of a surface using the camera 212. The processor(s) 206 may extract a measured spectrum from the image and generate a corrected spectrum to remove ambient light influence on the measured spectrum. In some examples, ambient light influences may be removed by white balancing, which is described in more detail with reference to FIG. 6. In some examples, the user interface(s) 214 may prompt the user 202 to capture a second image of a white card or other "control" under the same lighting conditions the surface image was acquired. The processor(s) 206 may extract a second measured spectrum from the second image and analyze the second measured spectrum to compensate for ambient light influence from the second measured spectrum and generate a second corrected spectrum. In some examples, white balancing may be applied on the second image to account for the "color temperature" of the light source 208 and/or ambient light.

In another example, camera 212 may acquire multiple images of the illuminated surface at once. The processor(s) 206 may compare each measured spectrum of the multiple acquired images and generate a corrected spectrum for each measured spectrum. The processor(s) 206 may generate an average spectrum of the corrected spectra of the multiple images.

The corrected spectrum (or averaged corrected spectrum in the examples where multiple spectra are acquired) generated from the measured spectrum (or spectra) by the processor(s) 206 by white balancing and/or other method may be compared with one or more reference spectra in a database of reference spectra, which may be stored as data 226 in the computer readable medium 224 in some examples. In some examples, one or more of the spectra may each correspond to a different product (e.g., different paint color, different foundation color). In other examples, one or more of the spectra may each correspond to a condition (e.g., rosacea, melanoma). In some examples, the processor(s) 206 may determine the reference spectrum that has the closest match to the corrected spectrum. Techniques for comparing and/or determining closest match are described in more detail with reference to FIG. 4. Based on the comparing, the processor(s) 206 may output the product and/or condition (e.g., diagnosis of the condition) corresponding to the closest matching reference spectrum as a result. In some examples, a product recommendation and/or diagnosis may be based, at least in part, on the result, user preferences, user feedback, or a combination thereof.

In some examples, the processor(s) 206 may implement a machine learning model that is trained to provide the product recommendation and/or diagnosis based on the corrected spectrum and/or closest matching reference spectra(um). In some examples, the machine learning model may provide the product recommendation and/or diagnosis based, at least in part, on user feedback received with respect to a prior product recommendation and/or diagnosis. In some examples, the machine learning model may be implemented by executable instructions 228 executed by the processor(s) 206. In some examples, the machine learning model, or a portion thereof, may be implemented in hardware included with processor(s) 206.

In some examples, the processor(s) 206 may be communicatively coupled to a cloud computing device 230 through the user interface(s) 214. The processor(s) 206 may provide the images and/or spectra (e.g., measured, corrected) to the cloud computing device 230. The cloud computing device 230 may generate a corrected spectrum, compare the corrected spectrum to a database of reference spectra stored on the cloud computing device 230, provide a result based on the comparison (e.g., product recommendation, diagnosis), and/or make an inference to generate a result based at least in part on a machine learning model implemented by the cloud computing device 230. The cloud computing device 230 may provide the corrected spectrum, one or more reference spectra, diagnosis, and/or recommended product(s) to the processor(s) 206. The corrected spectra, product recommendation, and/or diagnosis may be provided on display 204 in some examples. In some examples, the cloud computing device 230 may include a database of products and/or conditions in a computer readable medium/media (not shown). This arrangement may be desirable in some applications, for example, when the computing device 218 may have limited computational ability, such as if computing device 218 is included with a compact mobile device 222. This arrangement may be more convenient for when the machine learning model is dynamically trained and/or the spectral database is dynamically updated.

Figure 3:
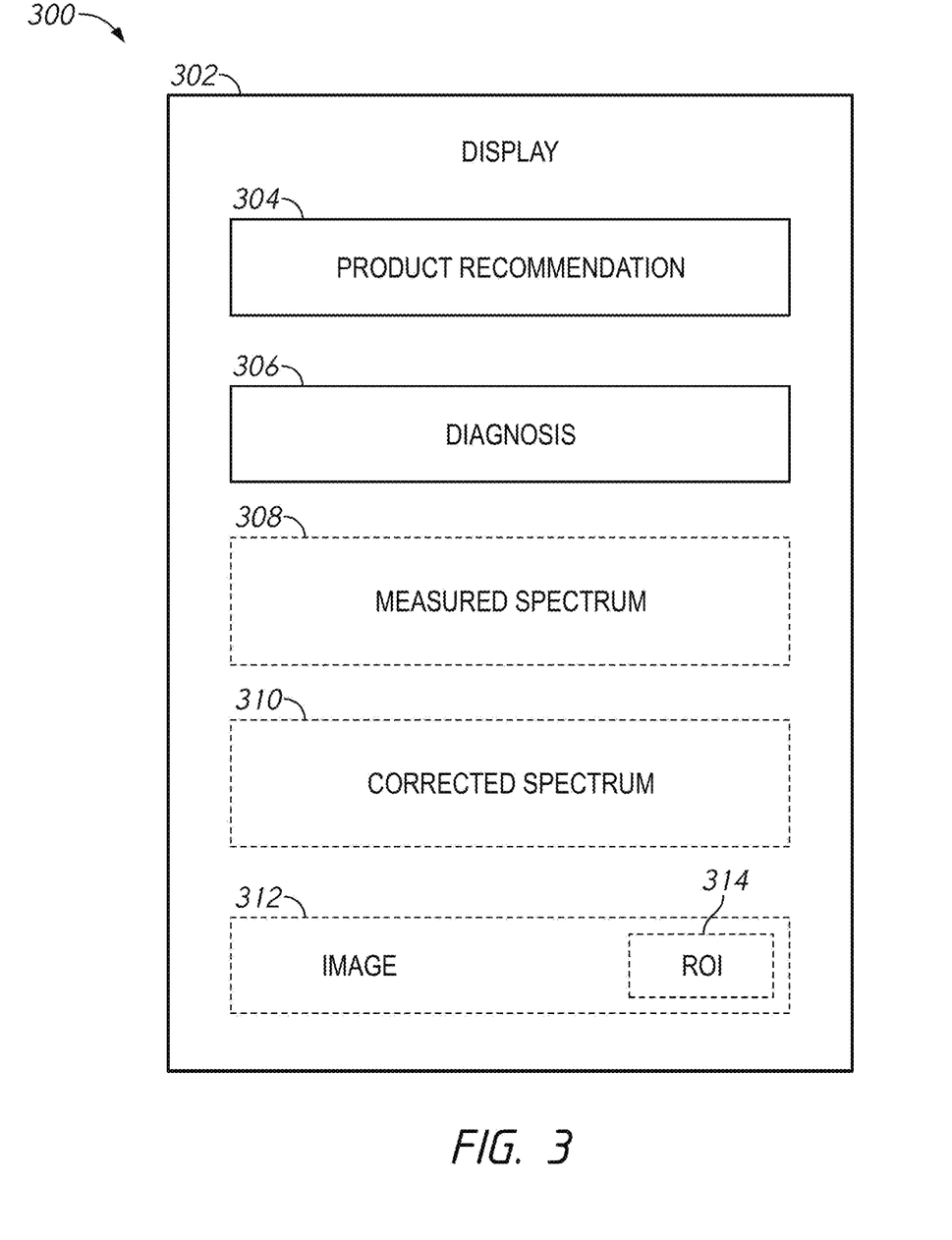
FIG. 3 is an example of a mobile device in accordance with examples of the present disclosure.

FIG. 3 is an example of a mobile device 300 in accordance with examples of the present disclosure. In some examples, mobile device 300 may be used to implement mobile device 222. The mobile device 300 may include a display 302. The display 302 may provide the GUI implemented by the mobile device 222. For example, the display 302 may provide a diagnosis 306, a measured spectrum 308 and/or a corrected spectrum 310. In some examples, the mobile device 300 provides and displays on display 302 a diagnosis representative of a comparison between the corrected spectrum 310 and a database of spectra. The display 302 may include a product recommendation 304 based at least in part on the diagnosis 306.

Optionally, in some examples, the display 302 may provide an image 312 of a surface (e.g., surface 112) acquired by a camera (e.g., camera 212) of the mobile device 300. In some examples, a user (e.g., user 202), may be able to select a region of interest (ROI) 314 within the image 312. For example, if display 302 is a touch screen, the user may tap or circle a portion of image 312 to select the ROI 314. In some examples, the measured spectrum may be extracted only from data in the image 312 in the ROI 314.

Figure 4:
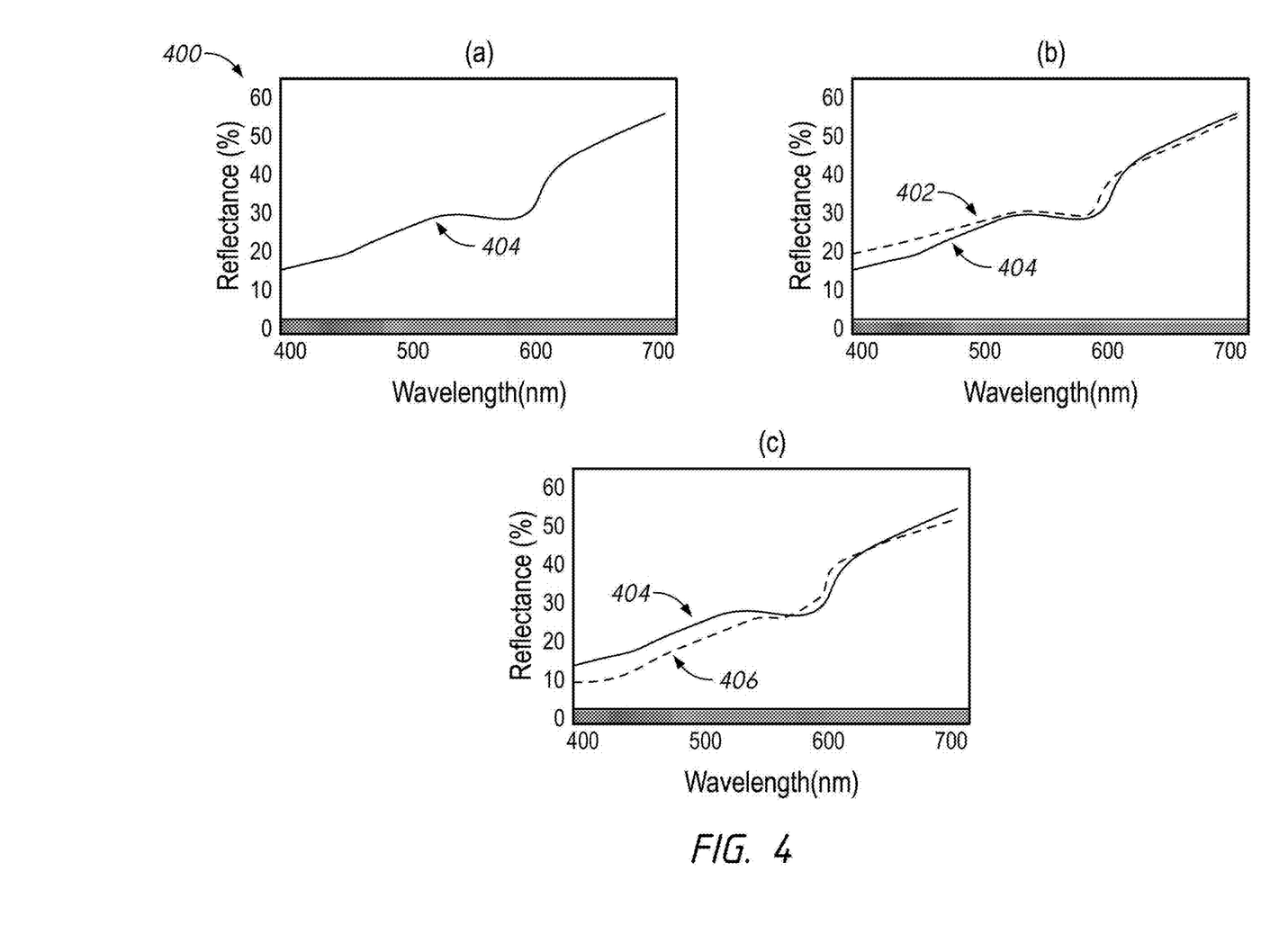
FIG. 4 illustrates example spectral plots in accordance with examples of the present disclosure.

FIG. 4 illustrates example spectral plots 400 in accordance with examples of the present disclosure. The spectral plots 400 may be generated by and/or stored in a computing device, such as computing device 110 and/or 218, which may be included on a mobile device such as mobile device 222 and/or mobile device 300. In some embodiments, the spectral plots 400 may be displayed to a user, for example on display 204 and/or 302. In FIG. 4, spectral plot (a) illustrates a corrected reflectance spectrum 404 over a range of wavelengths. Examples of the range of the wavelengths include an ultraviolet spectrum (UV), a visible spectrum, and/or an infrared spectrum. The UV spectrum includes a wavelength range generally from about 10 nm to about 400 nm. The visible spectrum includes a wavelength range generally between about 380 nm and about 760 nm. The infrared spectrum generally includes a wavelength range of about 700 nm to about 1 mm.

As described herein, for example with reference to FIGS. 1 and 2, a corrected spectrum (e.g., a corrected spectrum calculated by processor 102 and/or processor 206) may be compared to one or more reference spectra from a database of reference spectra by a computing device, such as computing device 110 and/or 218. In some examples, each spectrum may correspond to a product (e.g., paint color, foundation shade). Spectral plots (b) and (c) are examples of a comparison between the corrected reflectance spectrum 404 and reference spectra 402, 406 from a database of reference spectra. Methods of comparison may include a regression analysis such as least mean squares, least squares, or total least squares. In some examples, the reference spectrum having the closest fit to the corrected spectrum of the surface may be used to identify candidate product(s) and provide a product recommendation. In this example, spectral plot (b) illustrates the corrected spectrum 404 in comparison to a first reference spectrum 402 and spectral plot (c) is the corrected spectrum 404 in comparison to a second reference spectrum 406. In the example shown in FIG. 4, the first spectrum 402 has a closer fit to the corrected spectrum 404 than the second spectrum 406. Thus, a product corresponding to the spectrum of 402 may be selected as the recommendation. In an example where the user seeks a product recommendation for their skin (e.g., a foundation), the recommended product(s) may have a spectrum that is the closest match to the spectrum of the user's skin tone.

Additionally or alternatively, instead of finding the reference spectra with the best fit over the entire range of wavelengths, the comparison may be over a portion of the wavelengths. Finding the closest match over only a portion of the spectrum may be suitable when only a portion of the spectrum will influence the appearance of the product. For example, spectral properties of a product in the UV and/or far IR regions may have little to no influence on how the product will appear to a user. Accordingly, in some examples, these regions of the spectrum may be ignored when calculating the reference spectrum that is the best fit to the corrected spectrum 404.

In other examples, the user may seek recommendations for decor based on a color of a wall. Based on the corrected spectrum of the wall, the candidate products may include fabrics and/or other products of colors that match the wall. In these examples, the corrected spectrum may be compared to reference spectra as discussed above. Additionally or alternatively, rather than providing a matching (e.g., same) color, colors that are aesthetically pleasing or complement the color of the wall may be provided as product suggestions. For example, if the wall is determined to be a bright tone that captures attention due to its strong hue and/or brightness (e.g., red, yellow, orange), the recommendation may be a color that balances the strong hue and/or brightness (e.g., tan, gray). In these examples, the closest matching reference spectrum may be associated with a database of complementary colors and/or products in complementary colors. Alternatively, the corrected spectrum may be analyzed to determined relative or absolute intensities in different spectral ranges (e.g., red, blue, green). These intensities may be compared to reference tables of intensities that are correlated to databases of complementary colors. In another example where the user is looking for a recommendation of clothing articles, the user may acquire an image of an article of clothing and the user may receive recommendations for other apparel or accessories that may go well with the clothing article in the image based on the color. Example recommendations may include a pair of shoes, earrings, ties, sunglasses, etc.

Figure 5:
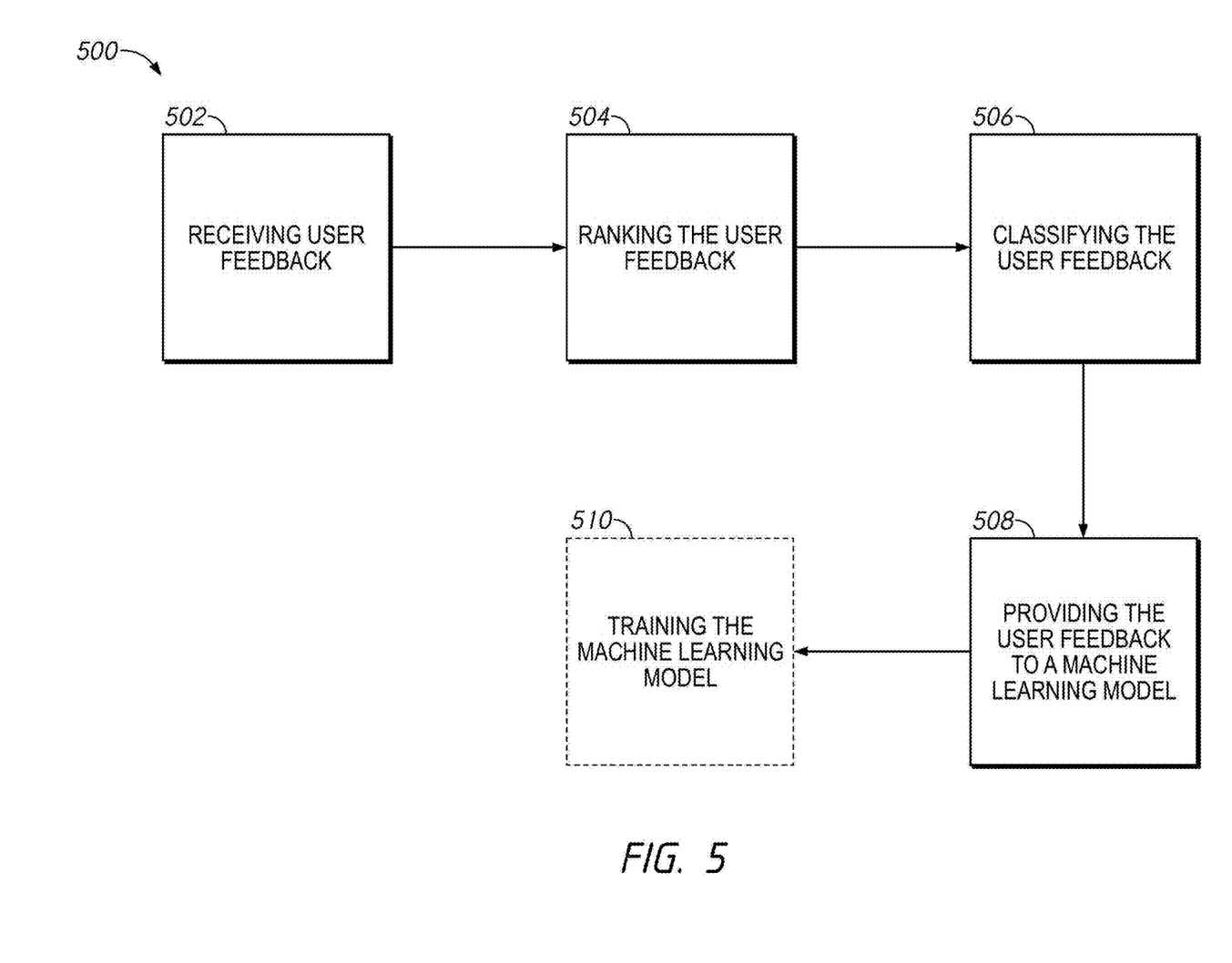
FIG. 5 illustrates a method in accordance with one embodiment with examples of the present disclosure.

FIG. 5 is a flow chart of a method 500 in accordance with examples of the present disclosure. The method in FIG. 5 illustrates a method when user feedback is included in the database of product recommendations and/or diagnoses updated based on the user feedback. In some examples, all or a portion of method 500 may be performed by a computing device, for example, computing device 114 in FIG. 1 and/or computing device 218 in FIG. 2. In some examples, all or a portion of the method 500 may be performed by a machine learning model implemented by processor 102 in FIG. 1 processor(s) 206 in FIG. 2, cloud computing device 110, and/or cloud computing device 230.

At block 502, "receiving user feedback" may be performed. In some examples, the display (e.g., display 204 and/or display 302) may prompt the user to provide user feedback on the product recommendation(s). In an example, the user feedback may be received by a user interface, such as user interface(s) 214 illustrated in FIG. 2. In some examples, the user feedback may include text, images, and/or sound data. In some examples, the user feedback may be received from a mobile device, such as mobile device 222, and/or a computing device, such as computing device 114 or computing device 218. The user interface(s) 214 may transmit the user's input to a processor (e.g., processor 102 and/or processor(s) 206) and/or a cloud computing device (e.g., cloud computing device 110 and/or cloud computing device 230).

At block 504, "ranking the user feedback" may be performed. In some examples, a rank may indicate a level of satisfaction of the product recommendation and/or diagnosis provided by the user. At block 506, "classifying the user feedback," may be performed. In some examples, a classification may indicate one or more factors included in the user feedback. For example, a user may be satisfied with the accuracy of the diagnosis, but unsatisfied with the price range of the product recommendation. In some examples, the classifying may be a rules-based classification. In some examples, block 506 may be performed before block 504. In some examples, blocks 504 and 506 may be performed simultaneously.

At block 508, "providing the user feedback to a machine learning model" may be performed. The user feedback provided to the machine learning model may include the ranked user feedback in some examples. That is, the user feedback provided to the machine learning model may be modified from the data originally received at block 502. In some examples, the user feedback may be used as a training data set to train the machine learning model. Optionally, at block 510 "training the machine learning model" may be performed. The machine learning model may be trained with the training data set.

As such, the user feedback may be reflected in future product recommendations and/or diagnoses. In some examples, a product recommendation of a lower price range may be provided as a substitute product for the user who finds the result accurate, but the recommended product too pricey. In some other examples, the user interface may periodically ask the user to complete a survey. The survey may include question including ratings on the product recommendation and/or accuracy of diagnosis, user's preferences on additional features of the product, e.g., Sun Protection Factor (SPF) products, highly concealing foundation, hypoallergenic paint, etc. Accordingly, the user may train the machine learning model to recommend products with the feedback the user provides to the user interface.

In some examples, the machine learning model may include a neural network. In some examples, neural network may be a convolutional network with two dimensional or three dimensional layers. The neural network may include input nodes that receive input data (e.g., the corrected spectrum, reference spectrum, combinations thereof, and/or portions thereof). In some examples, the input nodes may be organized in a layer of the neural network. The input nodes may be coupled to one or more layers of hidden units by one or more weights. In some examples, the hidden units may perform operations on one or more inputs from the input nodes based, at least in part, with the associated weights between the nodes. In some examples, the hidden units may be coupled to one or more layers of hidden units by weights. The hidden units may perform operations on one or more outputs from the hidden units based, at least in part, on the weights. The outputs of the hidden units may be provided to an output node to provide a result (e.g., product recommendation, diagnosis). Of course, a neural network is provided merely as an example and one or more other machine learning models may be used (e.g., decision trees, support vector machines). In some examples, the machine learning model may include different machine learning models for different applications. For example, there may be a machine learning model for cosmetic applications (e.g., determining cosmetic product recommendations) and a separate machine learning model for other applications (e.g., determining coordinating apparel/accessories).

In some examples, the machine learning model may be trained by providing one or more training data sets. The machine learning model may be trained by the computing device (e.g., computing device 114, 222, cloud computing device 110, 230) used to make inferences with the machine learning model in some examples. In some examples, the machine learning model may be trained by another computing device to determine appropriate machine learning model to implement, weights, node arrangements or other model configuration information, and the trained machine learning model may be provided to the computing device used to make the inferences.

In some examples, the machine learning model may be trained using supervised learning techniques. In some examples, training data may include a set of inputs x, each associated (e.g., tagged) with a desired result y. Each input x may include one or more values for one or more spectra. For example, one input x may include a spectrum associated with a result y that is a reference spectra associate with a paint color. Based on the training data set, the machine learning model may adjust one or more weights, number of layers, or other components of the model. The trained machine learning model may then be used to make inferences on inputs x (that are not associated with desired results) to generate results y. In some examples, the machine learning model may be trained using semi-supervised and/or unsupervised techniques. In these examples, data sets may not include a desired result associated with every input.

In some examples, such as the one described in FIG. 5, the machine learning model may be dynamically trained. That is, even if the machine learning model is initially trained by another device, the machine learning model may continue to adjust based on new data. For example, new products and/or user feedback may cause the machine learning model to adjust.

Figure 6:
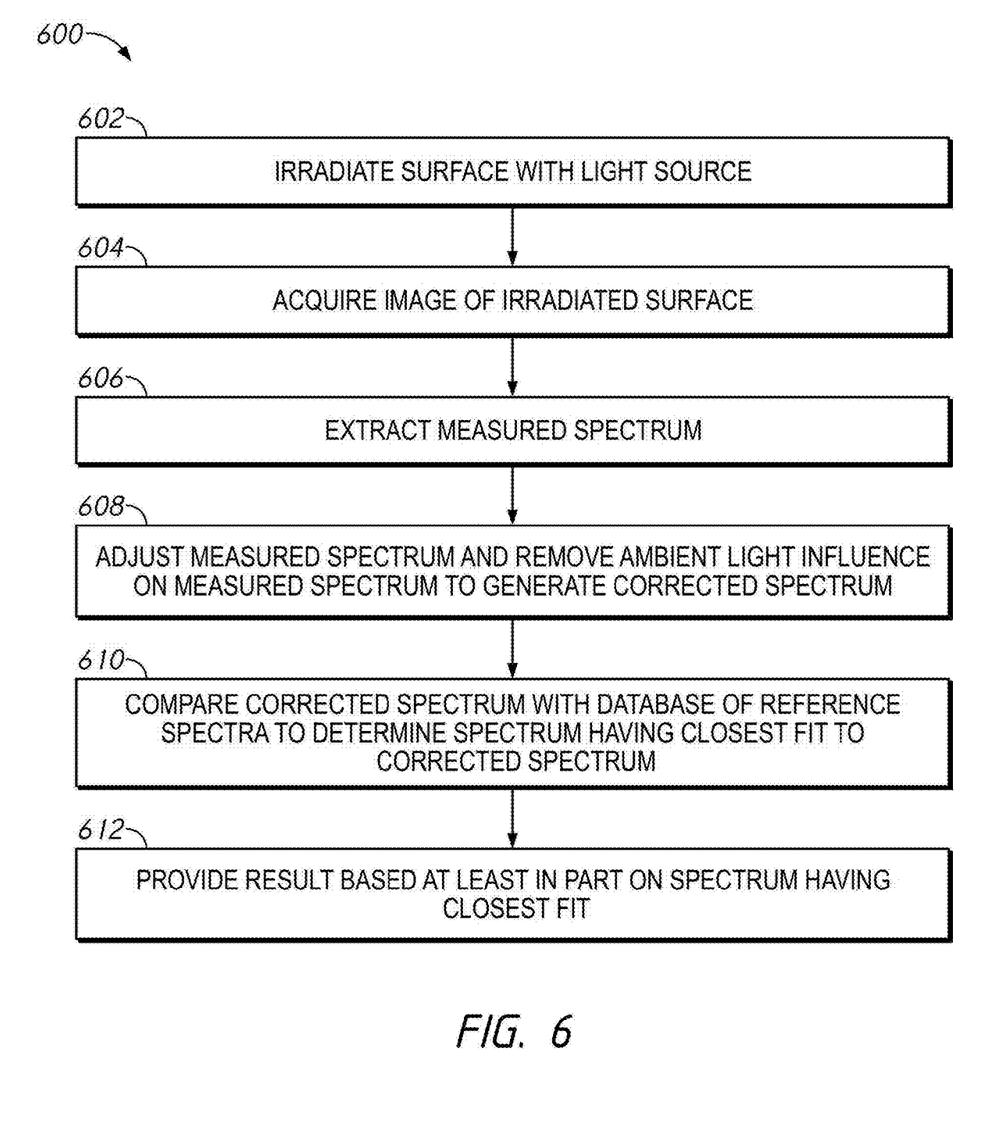
FIG. 6 is a flowchart of a method in accordance with examples of the present disclosure.

FIG. 6 is a flowchart of a method in accordance with examples of the present disclosure. At block 602, the mobile device irradiates a surface with a light source, e.g., light source 106 in FIG. 1 and/or light source 208 in FIG. 2. At block 604, the mobile device acquires an image of the irradiated surface with a camera as shown in camera 104 in FIG. 1 and camera 212 in FIG. 2.

At block 606, a processor, such as processor 106 and/or processor 206 extracts a measured spectrum representative of a color of the surface from the image. In some examples, the processor may extract a measured spectrum from the image by decoding the color of the surface with red-green-blue (RGB) weighting and assigning an RGB color code for the color of the surface. Histograms of red, green, and blue pixels may be generated for an image. The color of the surface may be determined based, at least in part, on the concentration of pixels. For example, if there is approximately the same number of red, green, and blue pixels, the processor may assign an RGB color code indicating no one color is predominate.

Additionally or alternatively, the processor may extract a measured spectrum by applying MPEG 7 global descriptors. MPEG 7 global descriptors define various color descriptors representing different aspects of color features including the representative colors, the basic color distribution, the global spatial distribution of colors, the local spatial distribution of colors, and the perceptual temperature feeling of an image. There are five color descriptors to represent different aspects of color features: DominantColor for representative colors, ScalableColor for basic color distribution, ColorLayout for global spatial distribution of colors, ColorStructure for local spatial distribution of colors, and ColorTemperature describing the perceptual temperature feeling of an image. In addition, the GoFGoPColor descriptor is defined as an extension of ScalableColor to groups of frames or pictures. Three supporting tools are defined: ColorSpace, Color Quantization, and IlluminationInvariantColor. All the descriptors and tools are applicable to arbitrarily shaped regions. In correcting the measured spectrum, a signal to noise ratio of the measured spectrum may be optimized by using a filter and/or averaging the measured spectra.

Thus, the RGB color code, histogram, and/or MPEG 7 global descriptors may be used to generate a measured spectrum in some examples. In some examples, this may be performed by machine learning. The machine learning model may be trained similar to as described above with reference to FIG. 5. For example, the machine learning model may be provided with RGB color codes, histograms, and/or MPEG7 global descriptors associated with spectra acquired by a spectrometer. However, in other examples, other methods of generating a spectrum from the RGB color code, histogram, and/or MPEG 7 global descriptors may be used. In other examples, the measured and corrected spectrum are maintained in the RGB color code, histogram, and/or MPEG 7 global descriptor format and the spectra of the database of reference spectra is also in RGB color code, histogram, and/or MPEG 7 global descriptor format.

At block 608, the measured spectrum is adjusted by the processor by removing ambient light influence on the measured spectrum to a corrected spectrum is generated. In some examples, ambient light influences may be removed by white balancing. In some examples, the user may be prompted to take an image of a white card as a white reference under the same lighting environment as that of the surface. The processor may extract a measured spectrum of the white card representative of ambient light influence (Ia) and a measured spectrum of the image of the surface. To generate a corrected spectrum of the surface, the processor may subtract the measured spectrum of the white card from the measured spectrum of the image of the surface.

At block 610, the corrected spectrum may be compared with a database of reference spectra to determine a reference spectrum having a closest fit to the corrected spectrum by the processor. For example, as discussed with reference to FIG. 4. At block 612, a result may be provided based, at least in part, on the spectrum having the closest fit. In some examples, the result may be provided via a GUI on a display, for example, display 204 and/or display 302.

Optionally, in some examples, a flood illuminator or other light source may illuminate the surface of which an additional image is acquired to detect additional surface properties including texture and sub-properties. Texture analysis may be performed to adjust for the texture from the color of the surface. Examples of texture may include shininess of the skin. White balancing may be applied on the additional image to account the "color temperature" of the light source. A color spectrum may be analyzed based on the image of the surface and the additional image taken with the flood illuminator. A diagnosis or recommendation of product may be provided based on the color spectrum.

Optionally, in some examples, the corrected spectrum may be analyzed to determine a shininess of the surface. In an example of the surface being skin cells, shininess may indicate oiliness. A matte foundation may be recommended for oily skin. In some examples, the shininess of the surface may be determined by a specular reflectance based on a ratio of intensities of a light source used to illuminate the surface and light reflected from the surface. For example, shininess may be determined by a ratio of an intensity of a reflected beam and an intensity of an unpolarized light source. The surface may be determined to be shiny if the intensity of the reflected light is greater than a threshold value. In some examples, the threshold value may be some percentage of the intensity of the light source. A surface may be determined to be matte if the intensity of the reflected light is less than the threshold value.

Figure 7:
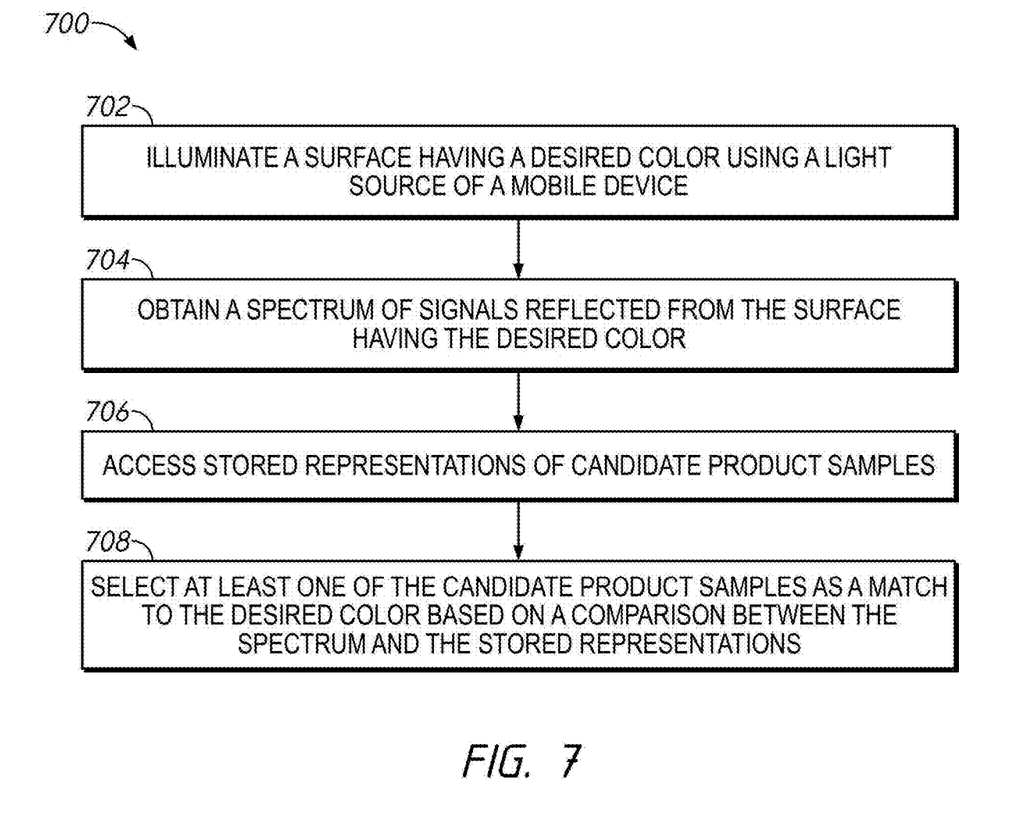
FIG. 7 is a flowchart of a method in accordance with examples of the present disclosure.

FIG. 7 is a flowchart of a method in accordance with examples of the present disclosure. The method in FIG. 7 illustrates a method for when a spectrometer, such as a spectrometer 104 in FIG. 1 and/or spectrometer 210 in FIG. 2, is used to acquire a spectrum of a surface.

At block 702, a mobile device illuminates a surface having a desired color using a light source, e.g. light source 106 in FIG. 1 and/or light source 208 in FIG. 2. The light source may be provided by the mobile device, such as mobile device 222 in FIG. 2 or mobile device 300 in FIG. 3.

At block 704, the processor, as illustrated by processor 102 and/or processor(s) 206, of the mobile device may obtain a spectrum of signals reflected from the surface having the desired color as explained in reference to FIGS. 1 and 2. In some examples, the spectrum of signals may be obtained by a spectrometer coupled to the mobile device as explained in reference to FIG. 2.

At block 706, the mobile device may access stored representations of candidate product samples. The stored representations may be a local memory, implemented by memory 216, or a remote memory including a cloud memory, etc. Examples of the cloud memory may be illustrated in cloud computing device 110 in FIG. 1 and/or cloud computing device 230 in FIG. 2.

At block 708, the processor compares the spectrum of signals obtained by the spectrometer and selects at least one of the candidate product samples as a match to the desired color based on a comparison between the spectrum and the stored representations. In the example where the candidate product samples include makeup foundation, the surface of the desired color may be skin. In another example where the candidate product samples include paint samples, the surface having the desired color may be an object (e.g., a wall, car) or a portion of an image. Optionally, in some examples, the user may provide user feedback with respect to the candidate product samples as described in FIG. 5. In some examples, the user feedback may influence future selection of candidate product samples.

As disclosed herein, in a variety of applications (e.g., cosmetics, interior design, fashion), a mobile device may analyze surface color and provide a diagnosis of the surface and/or product recommendation based on analysis of the surface. Accordingly, the devices, systems, methods, and apparatuses of the present disclosure may allow users to acquire data on surface colors and receive a recommendation based, at least in part, on the surface color without expensive and/or specialized equipment.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above-discussion is intended to be merely illustrative and should not be construed as limiting the appended claims to any particular embodiment or group of embodiments. Thus, while various embodiments of the disclosure have been described in particular detail, it should also be appreciated that numerous modifications and alternative embodiments may be devised by those having ordinary skill in the art without departing from the broader and intended spirit and scope of the present disclosure as set forth in the claims that follow. Accordingly, the specification and drawings are to be regarded in an illustrative manner and are not intended to limit the scope of the appended claims.

What is claimed is:

1. A method comprising:
acquiring an image of a surface irradiated with a light source of a mobile device;
acquiring a measured spectrum of the surface with a spectrometer of the mobile device;
analyzing the measured spectrum to reduce an influence of ambient light from the measured spectrum and generating a corrected spectrum, wherein generating the corrected spectrum comprises subtracting the influence of ambient light and an influence of the light source from the measured spectrum;
generating an averaged corrected spectrum using the corrected spectrum and at least one other corrected spectrum associated with the surface;
generating a result based on a comparison of the averaged corrected spectrum and a database of reference spectra; and
providing at least one of a product recommendation or a diagnosis based, at least in part, on the result.

2. The method of claim 1, further comprising displaying the image of the surface and at least one of the product recommendation or the diagnosis.

3. The method of claim 1, further comprising prompting a user to provide user feedback about the product recommendation or the diagnosis.

4. The method of claim 3, further comprising implementing a machine learning model to provide the product recommendation or the diagnosis and updating the machine learning model with the user feedback.

5. The method of claim 1, further comprising estimating a specular reflectance based, at least in part, on a measured reflected beam of intensity and an unpolarized light of intensity.

6. The method of claim 5, wherein providing the at least one of the product recommendation or the diagnosis is based, at least in part, on the estimated specular reflectance.

7. A method comprising:
illuminating a surface using a light source of a mobile device;
obtaining, at the mobile device, a spectrum of signals reflected from the surface;
generating an averaged spectrum using the obtained spectrum and at least one other spectrum associated with the surface;
accessing, with the mobile device, stored representations of candidate product samples;
selecting at least one of the candidate product samples as a match to a color of the surface based on a comparison between the averaged spectrum and the stored representations;
incorporating a user's feedback of the selected one of the candidate product samples in future selections, wherein the user's feedback is ranked based on a level of satisfaction with the selected one of the product and classified based on one or more factors included in the user's feedback for future selections.

8. The method of claim 7, wherein the candidate product samples comprise makeup foundation and the surface being skin.

9. The method of claim 7, wherein the candidate product samples comprise paint samples and the surface comprises an object or a portion of an image.

10. The method of claim 7, wherein the candidate product samples being clothing articles and the surface comprises a portion of an image.

11. The method of claim 7, further comprising illuminating the surface using a camera of the mobile device.

12. The method of claim 7, further comprising obtaining the spectrum of signals using a spectrometer connected to the mobile device.

13. The method of claim 7, further comprising accessing the stored representations of candidate product samples from a remote storage device.

14. The method of claim 13, wherein the remote storage device is in a cloud system.

15. A mobile device comprising:
a light source; and
a processor;
wherein the mobile device is configured to:
illuminate a surface with the light source;
obtain a spectrum of signals reflected from the surface;
generate an averaged spectrum using the obtained spectrum and at least one other spectrum associated with the surface;
access stored representations of candidate product samples with the processor;
compare the averaged spectrum and the stored representations with the processor;
select with the processor at least one of the candidate product samples as a match to a color of the surface based on a comparison between the spectrum and the stored representations; and
incorporate a user's feedback of the selected one of the candidate product samples in future selections, wherein the user's feedback is ranked based on a level of satisfaction with the selected one of the product and classified based on one or more factors is included in the user's feedback for future selections.

16. The mobile device of claim 15, further comprising a display configured to provide at least one of the candidate product samples selected by the processor.

17. The mobile device of claim 15, wherein the mobile device further comprises a camera configured illuminate the surface.

18. The mobile device of claim 15, wherein the mobile device is connected to a spectrometer configured to obtain the spectrum of signals.

19. The mobile device of claim 15, wherein the mobile device is further configured to access the stored representations of candidate product samples from a remote storage device.

20. The mobile device of claim 19, wherein the remote storage device is in a cloud system.

* * * * *